United States Patent
Schaefer et al.

(10) Patent No.: US 8,222,565 B2
(45) Date of Patent: Jul. 17, 2012

(54) METHOD FOR LASER FUSION CUTTING WITHOUT CUTTING GAS

(75) Inventors: Peter Schaefer, Schramberg (DE); Peter Olschowsky, Schramberg (DE); Hubertus Melbert, Gerlingen (DE)

(73) Assignee: TRUMPF Laser GmbH + Co. KG, Schramberg (DE)

( * ) Notice: Subject to any disclaimer, the term of this patent is extended or adjusted under 35 U.S.C. 154(b) by 0 days.

(21) Appl. No.: 13/049,259

(22) Filed: Mar. 16, 2011

(65) Prior Publication Data

US 2011/0210106 A1    Sep. 1, 2011

Related U.S. Application Data

(63) Continuation of application No. PCT/DE2009/001247, filed on Sep. 8, 2009.

(30) Foreign Application Priority Data

Sep. 17, 2008 (DE) .......... 10 2008 047 761
May 15, 2009 (DE) .......... 10 2009 021 599

(51) Int. Cl.
   *B23K 26/16*   (2006.01)
(52) U.S. Cl. .............. 219/121.72; 219/121.84

(58) Field of Classification Search ......... 219/121.67–121.72, 121.84
See application file for complete search history.

(56) References Cited

U.S. PATENT DOCUMENTS 4,634,832 A * 1/1987 Martyr .................. 219/121.63
5,968,382 A * 10/1999 Matsumoto et al. ..... 219/121.72

FOREIGN PATENT DOCUMENTS

| DE | 102007062212 A1 | 6/2009 |
| EP | 1475182 A1 | 11/2004 |
| WO | 2008052547 A1 | 5/2008 |

OTHER PUBLICATIONS

Tahmouch et al., "Cutting by a high power laser at a long distance without an assist gas for dismantling", Optics & Laser Technology, vol. 29, No. 6, pp. 307-316, 1997.
Notification of Transmittal of Translation of the International Preliminary Report on Patentability for corresponding application No. PCT/DE2009/001247, mailed Mar. 31, 2011, 9 pages.

* cited by examiner

*Primary Examiner* — Samuel M Heinrich
(74) *Attorney, Agent, or Firm* — Fish & Richardson P.C.

(57) ABSTRACT

A method for laser fusion cutting of a metal workpiece including applying a laser beam to the workpiece, where a kerf is melted in the workpiece by the laser beam and a laser beam diameter in a working point is configured to expel molten material from the kerf without cutting gas.

19 Claims, 3 Drawing Sheets

METHOD FOR LASER FUSION CUTTING WITHOUT CUTTING GAS

CROSS-REFERENCE TO RELATED APPLICATIONS

This application is a continuation of, and claims priority under 35 U.S.C. §120 to, PCT/DE2009/001247, filed on Sep. 8, 2009, and designating the U.S., which claims priority under 35 U.S.C. §119 to German Patent Application No. 10 2008 047 761.3, filed on Sep. 17, 2008, and German Patent Application No. 10 2009 021 599.9, filed on May 15, 2009. The contents of the prior applications are hereby incorporated by reference in their entirety.

TECHNICAL FIELD

The present invention relates to a method for laser fusion cutting of a workpiece.

BACKGROUND

In conventional laser fusion cutting, a kerf is melted in a workpiece using a laser beam and the resulting molten material is expelled from the kerf using a cutting gas, such as nitrogen or argon. In addition to the high consumption of cutting gas typically required to produce the necessary gas pressures of up to 20 bar, the supply of the cutting gas is problematic in view of the accessibility at the processing point and also in view of tracking. Accessibility and tracking problems can be of particular concern in so-called remote applications in which the laser beam can cover a wide processing field via a scanner optics device without moving the processing head. DE 102 04 993 A1 proposes to movably mount gas nozzles to scanner optics (laser scanner) and track them through control in dependence on the beam deflection such that the gas flow and the laser beam emitted by the laser scanner are directed to the same area on the workpiece surface. This approach is disadvantageous due to the high level of gas consumption, the existing interference contour of the gas nozzles, the larger dimensions of the processing head, and the added expenses attributed to the integration of control systems. Additionally, the deflection speed of the laser beam can be limited by the maximum travel speed of the attached gas nozzles.

For sublimation cutting in which material is evaporated in the kerf, thereby producing as little molten mass as possible, using laser pulses of high power density (higher than in conventional laser fusion cutting), cutting gas can be omitted since the material vapor in the kerf generates a sufficiently high pressure to expel the molten material from the kerf or from the removal region in an upward and/or downward direction. However, depending on the application, the processing point may need to be shielded via a process gas, such as nitrogen, argon or helium, to protect it against oxidation. Also, sublimation cutting can require high laser power densities such that the removal rates and therefore the cutting depths that can be achieved are limited in practice, in particular for metals. Also, due to the relatively small removal volumes, sublimation cutting of increasingly higher thickness materials can require multiple contour processing.

SUMMARY

In certain aspects of the invention, a laser fusion cutting method is carried out without cutting gas. It has been found that such a method can be used even for larger sheet thicknesses.

In absence of cutting gas, a kerf is melted in a workpiece by a laser beam. Depending on the workpiece thickness, a laser beam diameter in the working point can be chosen such that the molten material can be expelled from the kerf without cutting gas.

In accordance with certain aspects of the invention, when the laser beam diameter is increased, the material vapor generated in the kerf in the area of the cutting front and the resulting vapor pressure are sufficient to expel the molten mass predominantly in a downward direction away from the cutting front. The laser beam diameter is typically adjusted to at least approximately 1.5 times (e.g., approximately 1.5 to 7 times), the maximum laser beam diameter that would typically be required for laser fusion cutting of a workpiece using cutting gas. Tests have shown that the laser beam diameter in the working point can be up to 15 to 30 times larger than the diameter of conventional laser fusion cutting methods using cutting gas. It should be noted that the cutting width which is larger due to the increased laser beam diameter in the working point does not in itself suggest sufficient pressure build-up within the kerf. In some embodiments, the laser beam diameter in the working point is approximately 0.3 mm to 3 mm (e.g., approximately 0.5 mm to 1 mm). The laser beam diameter in the working point can be formed by changing the focal point of the laser beam with respect to the working point.

The power density of the laser beam for melting the kerf and the feed rate of the laser beam relative to the workpiece are typically selected so that the expulsion process of the molten mass can be carried out without cutting gas.

The power density of the laser beam for melting the kerf is typically reduced compared to the power density that would be required for laser fusion cutting of a workpiece using cutting gas with the same feed rate.

In contrast to conventional laser fusion cutting methods using cutting gas, in certain aspects of the invention, a device for laser fusion cutting without cutting gas can be operated at substantially similar laser power densities as used in conventional laser beam welding. In some embodiments, the feed rate for a conventional laser beam welding device is reduced to between 30% and 60% of a conventional laser beam welding feed rate during welding of a material with a welding depth which is identical to the workpiece cutting thickness, to achieve laser fusion cutting without cutting gas. The table below provides examples of average feed rate comparisons for laser fusion cutting without cutting gas and laser welding for galvanized flat cold rolled steel workpieces having several thicknesses.

| Workpiece Thickness | Laser Welding Feed Rate | Laser Fusion Cutting Without Gas Feed Rate |
|---|---|---|
| 0.75 mm | 18 m/min | 6.5 m/min |
| 1.25 mm | 12 m/min | 4.5 m/min |
| 1.75 mm | 10 m/min | 3.5 m/min |

At these reduced feed rates, the surface tension of the molten material (molten mass) is overcome by the material vapor, and therefore the material pressure due to the narrower melting area, such that molten material can be expelled and cutting can occur. However, if the feed rate is reduced too low (e.g., reduced to less than 1.5 m/min), excess heat can build up in the workpiece, creating larger melting volumes which cannot be expelled by the material vapor and thus welding can occur.

Since it is not necessary to supply cutting gas and the above-mentioned disadvantages associated with using cutting gas are consequently reduced (e.g., eliminated) by not using cutting gas, the laser fusion cutting method without cutting gas can be more flexibly used, in particular, in connection with systems for remote processing and/or at points which are difficult to access.

Irrespective of the use of a system for remote processing or of a system with stationary optics in which the beam is exclusively guided via the movement of the processing head, standard optics, in particular welding optics, can be used with the laser fusion cutting methods described above. The option of performing welding and cutting tasks, in particular, in a sheet thickness range of approximately 0.5 mm to approximately 5 mm without structural modifications is particularly advantageous in this connection.

The power density of the laser beam for melting the kerf and the feed rate of the laser beam relative to the workpiece are typically selected so that a majority of the molten material is expelled from the kerf on the side of the workpiece opposite to the laser beam. Tests have shown that the molten discharge on the discharge side (lower side of the sheet) tends to be oriented in the cutting feed direction. In conventional fusion cutting methods using cutting gas, the molten material discharge is primarily oriented in a direction opposite to the cutting feed direction.

Air that contains large amounts of metal vapor can change the focus position of the laser beam and/or reduce the laser power during use. Removing such metal vapor from the work area can help to create more consistent process conditions for large focal lengths, such as in remote processing and in particular, across the overall processing field. Therefore, in some embodiments, a gas (e.g., air) can be blown into the area between the optics and the workpiece by one or more gas flow nozzles to confine metal vapor to an area close to the workpiece. For example, flow nozzles can be used to confine metal vapor to an area within 100 mm to 150 mm from the workpiece. Additionally or alternatively to blowing gas into the area, metal vapor that is near the optics can be extracted from the work area.

The flow velocity of the gas is typically so low that it does not influence the processing zone of the workpiece. The gas can furthermore be directed in the laser beam direction at an inclined angle onto the processing zone and/or at an inclined angle onto an area in front of the processing zone. The gas flow can be advantageously divergently directed onto the focused laser beam. Several gas nozzles are typically positioned around the laser beam in order to confine the air containing metal vapor to the area close to the workpiece.

At least one suitable gas nozzle can be used to direct at least one gas flow having a relatively small volumetric flow in the direction of the focused laser beam onto the processing or joining zone to penetrate the laser beam path, or at least partially cover it. The gas flow is thus directed from above onto the workpiece. The gas nozzle can be arranged around the laser beam in the form of a coaxial nozzle or in the form of several individual nozzles. In certain embodiments, the gas flow extends parallel to the workpiece. In such embodiments, the gas flow does not act on the workpiece as a cutting gas and/or protective gas but is able to keep the air containing metal vapor away from the radiation space of the impinging laser light. The orientation of the gas supply and the flow rates can be adjusted based on the separation between the nozzle(s) and the processing zone. In particular, when the gas supply is coupled with the processing head and the focal length is increased and therefore the distance from the processing zone is possibly larger, the flow rate is increased and the orientation of the nozzles is adjusted with respect to smaller focal lengths. When laser processing heads are used for remote processing, the gas supply is typically oriented parallel with respect to the laser beam when the focal length is increased to ensure that the air containing metal vapor is confined to an area close to the workpiece.

Another aspect of the invention relates further to the use of a device that is capable of laser welding a workpiece and also for laser fusion cutting of a workpiece without cutting gas. Such a device is configured to be used in either manner, for conventional laser welding or for laser fusion cutting without cutting gas by merely reducing the feed rate. In particular, for laser fusion cutting without cutting gas, the feed rate is typically reduced to between 30% and 60% of a feed rate used for conventional laser welding when the welding application meets the requirement for the laser beam diameter for laser beam fusion cutting without cutting gas. If necessary, the laser beam diameter can also be easily adjusted by optics for changing the focus of the laser.

Yet another aspect of the invention also relates to the use of a device for laser fusion cutting of a workpiece using cutting gas and also for laser fusion cutting of a workpiece without cutting gas. Such a device can transition from conventional laser fusion cutting using cutting gas to laser fusion cutting without cutting gas by merely increasing the laser beam diameter and, if necessary, reducing the power density of the laser beam on the workpiece and correspondingly adjusting the cutting feed rate.

Further aspects, features, and advantages of the invention can be found in the claims, the description and the drawings.

DETAILED DESCRIPTION

Figure 1:
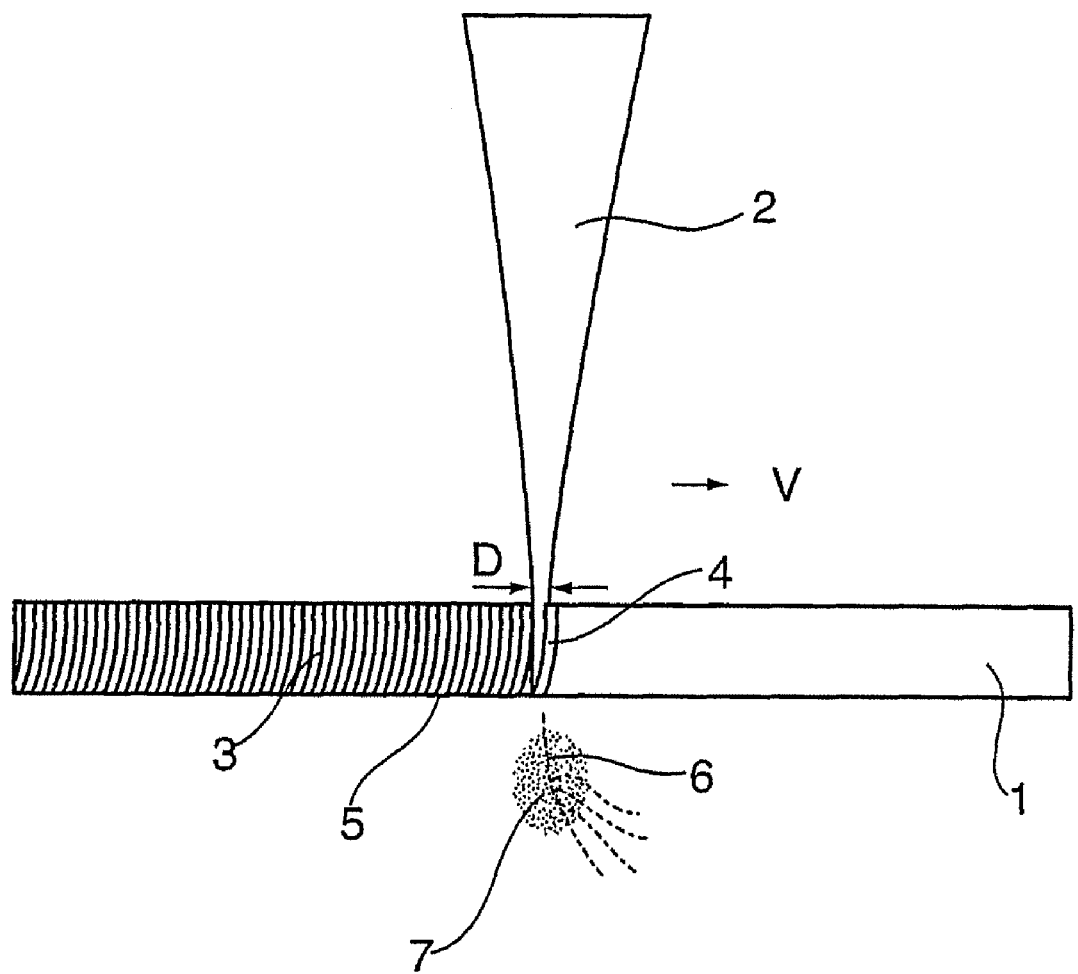
FIG. 1 shows a partial cross sectional schematic view of a workpiece being laser cut without the use of a cutting gas.

FIG. 1 schematically shows a method for laser fusion cutting without the use of cutting gas, in which a kerf 3 is melted in a workpiece 1 of metal using a laser beam 2. The power density of the laser beam 2 for melting the kerf 3 and the feed rate V of the laser beam 2 relative to the workpiece 1 are thereby selected in such a fashion that a molten material (molten mass) 4 is expelled from the kerf 3 without cutting gas, mainly on the workpiece lower side 5 opposite to the laser beam 2. The molten mass and/or slag materials expelled in this fashion from the kerf 3 on the workpiece lower side 5 is designated by 6 and the smoke that is generated as a result is designated by 7.

Tests have shown that when the laser beam diameter is increased and, in particular, the power density and the feed rate V are reduced relative to corresponding parameters used for conventional laser fusion cutting, the material vapor generated and prevailing in the kerf 3 and the resulting pressure are sufficient for expelling the molten material 4 mainly in a downward direction at the cutting front. The molten discharge on the workpiece lower side 5 has portions that face in the feed direction V.

Compared to conventional laser fusion cutting using cutting gas, in laser fusion cutting without cutting gas, an increased cutting gap or kerf 3 is formed through widening of the laser beam diameter D of the laser beam 2 on the workpiece 1. The presence of the increased cutting gap provides that molten mass can be expelled without cutting gas due to the pressure formed by the molten mass and the vapor. The laser beam diameter D can be up to 30 times larger (e.g., preferably up to 15 times larger), than the diameter of lasers used in conventional laser fusion cutting methods. In some embodiments, the diameter of the laser is 1.5 to 7 times larger than the diameter of lasers used in conventional laser fusion cutting methods. The diameter D for laser fusion cutting without cutting gas is typically in a range of between 0.3 mm to 3 mm, in particular (e.g., 0.5 mm to 1 mm).

The power density of the laser beam 2 is typically in the range of the power density typically used for laser welding, and the feed rate V of the laser beam 2 on the workpiece 1 is reduced. For example, a feed rate between 30% and 60% of a typical feed rate for laser welding of materials having similar thickness as workpiece 1 can be used. Tests have shown that at the reduced feed rates, the surface tension of the molten mass and/or slag materials is overcome by the material vapor, and therefore the material pressure due to the narrower melting area, such that molten material can be expelled and cutting occurs. However, if the feed rate is reduced too low, (e.g., less than 1.5 m/min), excess heat can build up in the workpiece, creating larger melting volumes which cannot be expelled by the material vapor and thus welding can occur. Also, the reduction of the feed rate V can be limited due to excessive heat input and associated larger melting volumes which can no longer be expelled by material vapor at very low feed rates, and thus welding can occur. For example, feed rates V of less than 1.5 m/min have been shown to result in laser welding.

Irrespective of whether a system for remote processing or a system with stationary optics in which the beam is exclusively guided via the movement of the processing head is used, standard optics, in particular welding optics, can typically be used for laser fusion cutting without cutting gas. This system is configured to perform welding and cutting tasks, in particular, in a sheet thickness range of between 0.5 mm and 5 mm, without structural modifications. For switching from a conventional laser welding process to laser fusion cutting without cutting gas process, the feed rate is typically reduced, to a feed rate that is between 30% and 60% of the feed rate used for conventional laser welding when the welding application meets the requirement for the laser beam diameter for laser fusion cutting without cutting gas.

Examples of substantial differences between laser fusion cutting without cutting gas and conventional laser fusion cutting with cutting gas of a steel sheet of a thickness of approximately 0.5 mm to 5 mm are listed below:

|  | Laser fusion cutting with cutting gas | Laser fusion cutting without cutting gas |
| --- | --- | --- |
| Cutting gas | Present | Omitted |
| Cutting nozzle | Present | Omitted |
| Scanner optics | Can only be realized with great effort | Can be realized |
| Laser beam diameter | 0.10 mm to 0.25 mm | 0.3 mm to 3.0 mm |
| Tolerance required for distance between optics and workpiece | ~1 mm | <10 mm |
| Laser power density | 100 kW/mm$^2$ to 300 kW/mm$^2$ | 10 kW/mm$^2$ to 50 kW/mm$^2$ |

Figure 2:
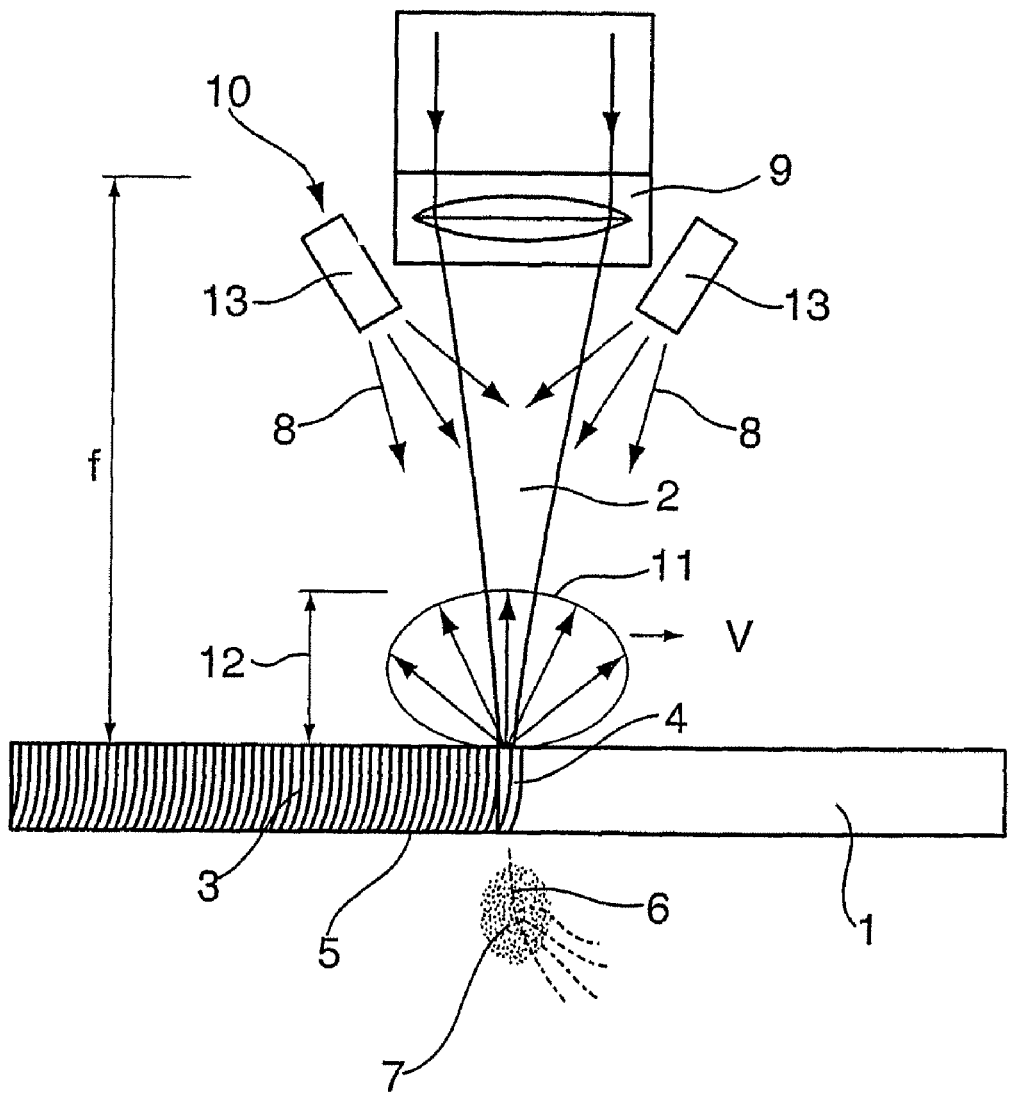
FIG. 2 shows a partial cross sectional schematic view of a workpiece being laser cut without the use of a cutting gas, with several gas flows being applied to the area above the processing zone.

As shown in FIG. 2 a device for laser fusion cutting without cutting gas produces several gas flows 8 having relatively small volumetric flow rates that are directed from above onto the processing zone of the workpiece 1 and the area above the processing zone. A limiting device 10 is provided on a focusing optics 9 having a focal length f that can be at least 200 mm. Limiting device 10 is configured to confine the air containing metal vapor 11 generated during laser cutting that can negatively affect the operation of the laser during use to an area 12 close to the workpiece. For example, the air containing metal vapor 11 can be confined to an area located up to 100 mm to 150 mm in front of the processing zone.

Limiting device 10 includes several gas nozzles 13 which are positioned around the impinging laser beam 2 and which each direct a divergent gas flow 8 having a relatively small volumetric flow rate from above onto the processing zone and the area above the processing zone. The gas flows 8 typically have a flow rate that is so small that the gas flow does not significantly influence the processing zone of the workpiece 1 and does not react with the laser beam 2. For example, the gas can be air and is thereby not expected to act on the workpiece 1 as a cutting gas and/or protective gas, but as discussed above, to displace the air containing metal vapor 11 from the radiation space of the impinging laser beam 2 remote from the workpiece 1. Therefore, a gas flow having a low flow rate and low pressure, (e.g. 0.2 bar) is sufficient. The pressure of the gas flow can be adjusted as the distance between the workpiece 1 and the gas flows 8 changes. For example, as this distance increases, the pressure is correspondingly increased to adequately confine the metal vapor.

In other embodiments, the several gas nozzles 13 shown can be replaced by one single annular nozzle that is disposed coaxially with respect to the laser beam 2.

The gas supply can, in principle, be oriented both at an inclined angle and/or perpendicularly with respect to a plane created on the workpiece by the processing point, wherein the gas flow at least partially penetrates through the laser beam 2.

Figure 3:
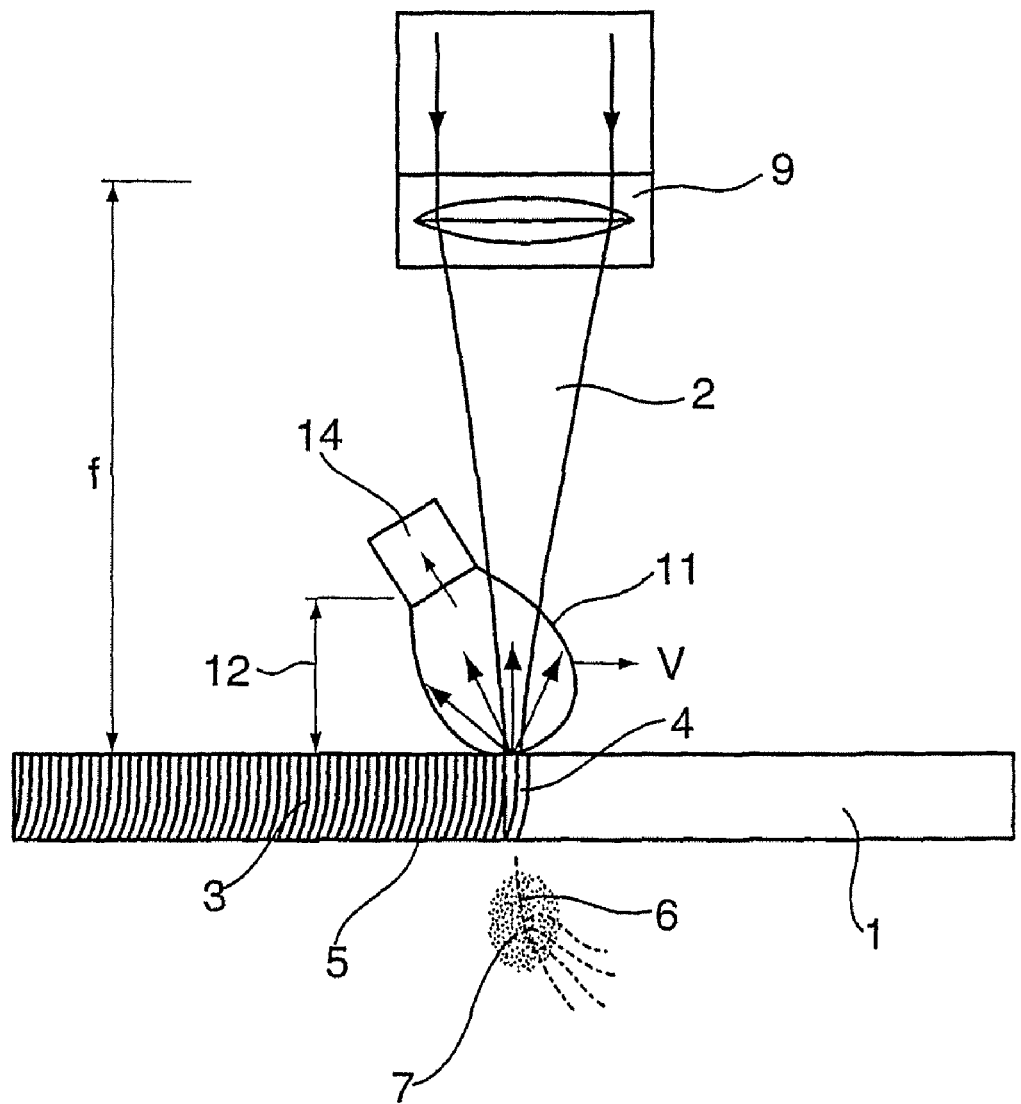
FIG. 3 shows a partial cross sectional schematic view of workpiece being laser cut without the use of a cutting gas while surrounding the workpiece is extracted by suction.

As shown in FIG. 3, a device for laser fusion cutting without cutting gas includes a suction device 14 positioned close to the workpiece 1. As discussed above, air containing metal vapor 11 generated during laser cutting can negatively affect the operation of the laser during use. To maintain consistent operating conditions, the air containing metal vapor 11 is extracted by suction device 14 during use. The suction device 14 can be provided laterally next to the impinging laser beam 2 to generate a vacuum for extracting the air containing metal vapor 11. The suction device 14 is disposed at a maximum separation distance ranging from 100 mm to 150 mm away from the processing zone such that the air containing metal vapor 11 is confined within the focused laser beam 2 to the area 12 close to the workpiece 1.

A number of embodiments of the invention have been described. Nevertheless, it will be understood that various modifications may be made without departing from the spirit and scope of the invention. Accordingly, other embodiments are within the scope of the following claims.

What is claimed is:

1. A method for laser fusion cutting of a metal workpiece, comprising:
applying a laser beam to the metal workpiece such that a kerf is melted in the workpiece by the laser beam, wherein the laser beam has a power density of 10 kW/mm2 to 50 kW/mm2 and a diameter sufficient to cause molten material to be expelled from the kerf without cutting gas;
producing at least one gas flow directed towards the workpiece to confine air containing metal vapor generated as a result of the laser contacting the workpiece to an area no greater than 150 mm in front of a point at which the laser beam is contacting the workpiece.

2. A method for laser fusion cutting of a metal workpiece, the method comprising:
applying a laser beam to the metal workpiece such that a kerf is melted in the workpiece by the laser beam, wherein the laser beam has a diameter sufficient to expel molten material from the kerf without the use of cutting gas.

3. The method according to claim 2, wherein the laser beam has a diameter at a working point on the workpiece that is at least approximately 1.5 times larger than a laser beam diameter required at the working point for laser fusion cutting of the workpiece using cutting gas.

4. The method according to claim 2, wherein the laser beam has a diameter at a working point on the workpiece that is approximately 0.3 mm to approximately 3 mm.

5. The method according to claim 4, wherein the diameter of the laser beam at the working point on the workpiece is approximately 0.5 mm to approximately 1 mm.

6. The method according to claim 2, wherein a power density of the laser beam and a feed rate of the laser beam relative to the workpiece allow the molten material to be expelled from the kerf without cutting gas.

7. The method according to claim 2, wherein a power density of the laser beam and a feed rate of the laser beam relative to the workpiece cause the majority of the molten material to be expelled from a side of the workpiece opposite a source of the laser beam without cutting gas.

8. The method according to claim 2, wherein a power density of the laser beam is less than to a power density required for laser fusion cutting of the workpiece using cutting gas, and a feed rate of the laser beam relative to the workpiece is the same as a feed rate required for laser fusion cutting of the workpiece.

9. The method according to claim 2, wherein a power density of the laser beam is 10 kW/mm$^2$ to 50 kW/mm$^2$.

10. The method according to claim 2, wherein a power density of the laser beam is equal to a power density required for laser welding the workpiece.

11. The method according claim 2, wherein the feed rate of the laser beam relative to the workpiece is 20% to 70% of a feed rate required for laser welding of the workpiece with the same power density and with a welding depth that is equal to the workpiece thickness.

12. The method according to claim 2, further comprising providing at least one gas flow to propel gas towards the workpiece.

13. The method according to claim 12, wherein the at least one gas flow confines ambient air containing metal vapor generated during the laser cutting to within 150 mm in front of a point at which the laser beam contacts the workpiece.

14. The method according to claim 13, wherein the at least one gas flow has a flow rate that does not influence a processing zone of the workpiece that is contacted by the laser beam.

15. The method according to claim 13, wherein the at least one gas flow is directed in a beam direction of the laser beam at an inclined angle onto a processing zone of the workpiece that is being contacted by the laser beam.

16. The method according to claim 13, wherein the at least one gas flow is directed in a beam direction of the laser beam at an inclined angle onto an area in front of a processing zone of the workpiece in which the laser beam contacts the workpiece.

17. The method according to claim 13, wherein the at least one gas flow is divergently directed onto the laser beam.

18. The method according to claim 13, wherein the ambient air containing the metal vapor is confined by multiple gas flows that are generated around the laser beam and directed onto an area in front of a processing zone of the workpiece in which the laser beam contacts the workpiece.

19. The method according to claim 1, wherein the ambient air containing metal vapor generated during laser cutting is extracted by suction.

* * * * *

UNITED STATES PATENT AND TRADEMARK OFFICE
CERTIFICATE OF CORRECTION

| | | |
|---|---|---|
| PATENT NO. | : 8,222,565 B2 | Page 1 of 1 |
| APPLICATION NO. | : 13/049259 | |
| DATED | : July 17, 2012 | |
| INVENTOR(S) | : Peter Schaefer et al. | |

It is certified that error appears in the above-identified patent and that said Letters Patent is hereby corrected as shown below:

Column 6, line 62 (Claim 1, line 62), delete "10 kW/mm2" and insert --10 kW/mm$^2$--

Column 6, line 63 (Claim 1, line 63), delete "50 kW/mm2" and insert --50 kW/mm$^2$--

Signed and Sealed this
Twenty-seventh Day of November, 2012

David J. Kappos
*Director of the United States Patent and Trademark Office*